(No Model.)
E. PRESCOTT.
END GATE FOR WAGONS.
No. 277,779. Patented May 15, 1883.
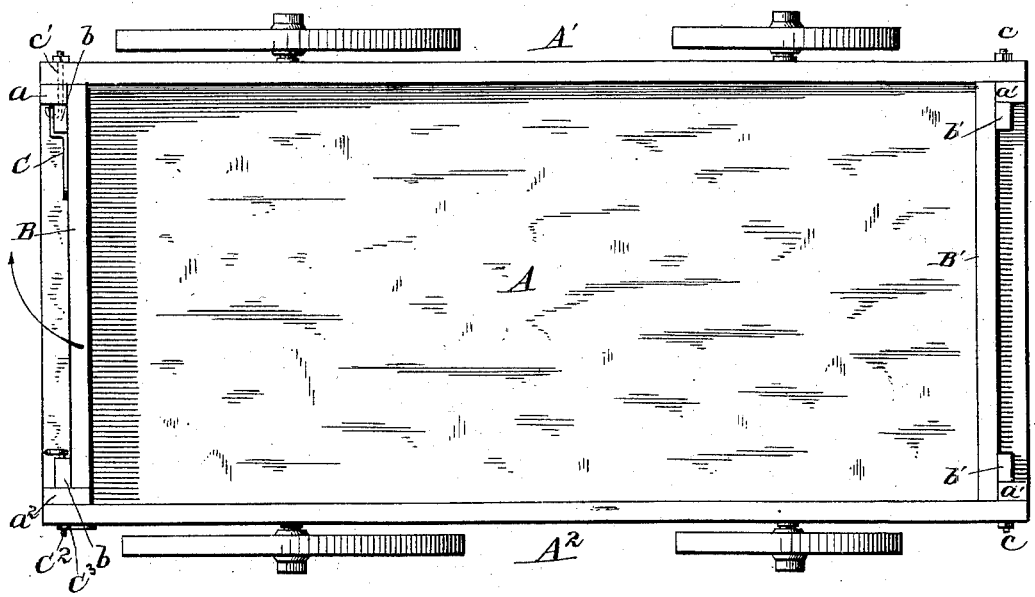
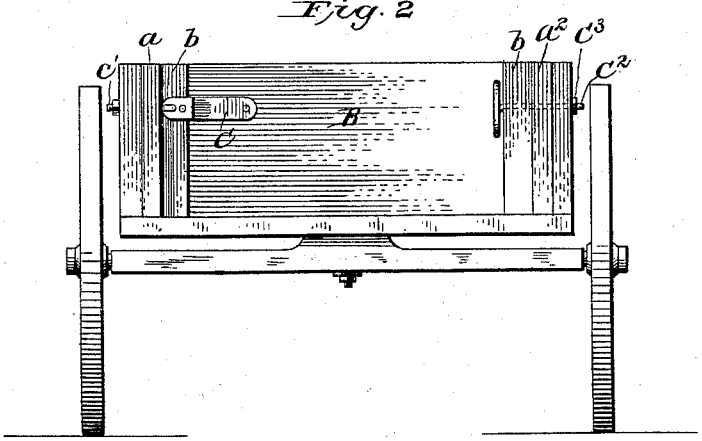
Witnesses:
A. M. Loag.
A B Richmond
Inventor
Edwin Prescott
By Halleck & Halleck
Attys.

UNITED STATES PATENT OFFICE.

EDWIN PRESCOTT, OF SPRINGBOROUGH, PENNSYLVANIA.

END-GATE FOR WAGONS.

SPECIFICATION forming part of Letters Patent No. 277,779, dated May 15, 1883.

Application filed October 5, 1882. (No model.)

*To all whom it may concern:*

Be it known that I, EDWIN PRESCOTT, a citizen of the United States, residing at Springborough, in the county of Crawford and State of Pennsylvania, have invented certain new and useful Improvements in Wagon-Bodies and Tail-Gates; and I do hereby declare the following to be a full, clear, and exact description of the invention, such as will enable others skilled in the art to which it appertains to make and use the same.

My invention relates to box-wagons.

Heretofore it has been the custom to attach the sides together by means of rods which extended through the sides and across the space between the sides, and clamped by means of nuts. The front and tail boards were held in place by grooves formed of cleats fastened to the inside of the sides at each end thereof.

The object of my invention is to improve upon that form of wagon; and the nature of it consists of parts and a combination of parts, all as will hereinafter be described.

In the drawings, Figure 1 represents a top plan view of the wagon, and Fig. 2 a rear elevation.

A represents the body; $A'$ $A^2$, the side-boards; B, the tail-gate, and $B'$ the front board. The front board is provided with cleats $b'$, which form a shoulder or rabbet, into which the cleats $a'$ on the sides $A'$ $A^2$ rest. The board is secured in place by bolts $c$, which pass through the side-board, cleat $a'$, and partly through cleat $b'$; or they may be passed through cleats $b'$ and be secured by a nut. The tail-gate B is also provided with cleats $b$. At one end is a hinge, C, which is attached by one end to gate B, passes over cleat $b$, and is attached to a hook-bolt, $C'$, which passes through side $A'$ and cleat $a$. The opposite end of the gate abuts against a wide cleat, $a^2$, attached to the side $A^2$. A bolt, $C^2$, passes through cleats $b$ $a^2$ and sides $A^2$, and is clamped by a hand-nut, $C^3$. This bolt serves as a catch, and when withdrawn from side $A^2$ and cleat $a^2$ leaves the gate free to move upon its hinge. By placing the tail-gate in this manner, the load, pressing thereon, will have cleat $a^2$ and bolt $C^2$ to prevent the tail-gate from being forced open. When bolt $C^2$ is withdrawn, the outward pressure of the load forces the gate open. This is considered a great advantage over the old form, as the load pressing against the tail-gate renders the latter very hard to remove, as the gate has to be lifted against the pressure of the load, instead of the pressure assisting in forcing the gate open, as in my device. By placing the cleats upon the outside of the gate, no gravel or other matter will interfere with the working of the gate, as is the case when the gate is placed between cleats.

I am aware that hinged tail-gates have been placed between cleats, one of which was pivoted in such a manner as to permit the gate to be swung upon its hinges and held in place when the gate was closed by a bolt passing through the side-boards and cleat, said bolt having an eye on its inner end, through which the tang of a hook on the tail-gate was passed, for the purpose of locking the said gate in place, and that I do not claim; but

What I claim as new is—

1. The combination, with the side-boards $A'$ $A^2$, having cleats $a$ $a^2$, and bolt $C'$, of a tail-gate having cleats $b$ $b$, hinge C, bolt $C^2$, and clamping-nut $C^3$, substantially as described.

2. The combination, with side-boards $A'$ $A^2$, having cleats $a$, $a'$ $a'$, and $a^2$, and bolts $C'$ and $c$, of tail-gate B, having cleats $b$ $b$, hinge C, bolt $C^2$, and nut $C^3$, and front board, $B'$, having cleats $b'$ $b'$, attached to cleats $a'$ by means of bolts $c$, substantially as described, and for the purpose set forth.

EDWIN PRESCOTT.

Witnesses:
A. B. RICHMOND,
H. M. RICHMOND.